United States Patent [19]

Ogita

[11] 4,378,573
[45] Mar. 29, 1983

[54] MAGNETIC RECORDING AND REPRODUCING SYSTEM WITH NOISE CANCELLATION

[75] Inventor: Minoru Ogita, Hamamatsu, Japan

[73] Assignee: Nippon Gakki Seizo Kabushiki Kaisha, Shizuika, Japan

[21] Appl. No.: 884,671

[22] Filed: Mar. 8, 1978

[30] Foreign Application Priority Data

Mar. 19, 1977 [JP] Japan ................................ 52-30739
Mar. 19, 1977 [JP] Japan ................................ 52-30740

[51] Int. Cl.³ .......................... G11B 5/43; G11B 5/02
[52] U.S. Cl. ........................................ 360/27; 360/28; 360/29; 360/30
[58] Field of Search ....................... 360/30, 29, 28, 27; 332/17, 41

[56] References Cited

U.S. PATENT DOCUMENTS

| | | | |
|---|---|---|---|
| 2,807,797 | 9/1957 | Shoemaker | 360/28 |
| 2,975,240 | 3/1961 | Berry | 360/28 |
| 3,012,234 | 12/1961 | Burns | 360/29 |
| 3,188,615 | 6/1965 | Wilcox, Jr. | 360/27 |
| 3,253,237 | 3/1966 | Runyan | 360/28 |
| 3,333,063 | 7/1967 | Stratton | 360/30 |
| 3,657,489 | 4/1972 | Clark, Jr. | 360/27 |
| 3,704,349 | 11/1972 | Goshimz et al. | 360/29 |
| 3,872,504 | 3/1975 | Belcher | 360/27 |

Primary Examiner—Vincent P. Canney
Attorney, Agent, or Firm—Sughrue, Mion, Zinn, Macpeak & Seas

[57] ABSTRACT

A magnetic recording and reproducing system is disclosed in which a frequency-modulated input signal is recorded on a magnetic medium together with a further signal which is discriminative from the frequency-modulated signal. The recorded frequency-modulated signal and further signal are frequency-demodulated so that the former reverts to the input signal and the latter represents an FM noise signal which is generated due to the wow and flutter during the recording and/or reproducing process. The extracted noise signal is mixed with the reproduced input signal thereby canceling an FM noise component in this reproduced signal. The mentioned further signal may be an amplitude-modulated signal of or a carrier wave signal for the frequency-modulated input signal.

9 Claims, 5 Drawing Figures

MAGNETIC RECORDING AND REPRODUCING SYSTEM WITH NOISE CANCELLATION

BACKGROUND OF THE INVENTION

This invention relates to a magnetic recording and reproducing system in which a frequency-modulated signal is recorded and reproduced, and is directed more particularly to such system in which a further signal is recorded and reproduced so that any wow and/or flutter components are separately extracted from the recovered further signal to implement noise cancellation during reproduction of the recorded signal.

For a magnetic recording and reproduction of audio signals or the like using a magnetic tape an AC bias recording system is commonly employed. In such a system a high-frequency bias signal of 50 KHz to 200 KHz is superimposed on an audio signal during recordation to linearize the magnetization curve of the tape. This system provides excellent recording sensitivity and a low distortion factor as compared with biasless and DC bias recording systems. An AC bias recording system, however, is not satisfactory with respect to its distortion characteristics and suffers from the further disadvantage that is difficulty in handling DC signals as required in a general purpose recording system. Therefor an FM recording system has been proposed to overcome the above disadvantages in the AC bias recording system. However, in the FM recording and reproducing system, wow and flutter in a recording medium transport mechanism causes a noise in the recorded and/or reproduced signal. This problem of frequency-modulation noise due to wow and flutter is common to virtually all FM recording and reproducing systems. The generation of wow and flutter depends on a number of complex factors, however, such as the cleanliness and contact condition of the tape and head surfaces, the tape flexibility, temperature, moisture, and the tape transport system. Therefore no satisfactory solution has been proposed to this problem. A DC signal can be recorded and reproduced using frequency modulation, but this does not avoid the plaguing problem of FM noise due to wow and flutter.

SUMMARY OF THE INVENTION

Accordingly, an object of the invention is to provide a magnetic recording and reproducing system which solves the above-described problems existing in the conventional systems.

More specifically, it is an object of the invention to provide a magnetic recording and reproducing system which is free from the frequency-modulation noise generally due to the so-called wow and flutter.

Another object is to provide a magnetic recording and reproducing system which is capable of handling DC signals at a high fidelity.

The foregoing and other objects are achieved according to the present invention by providing a magnetic recording and reproducing system wherein, in a first embodiment, a frequency-modulated input signal is further subjected to amplitude modulation by a signal whose frequency is lower than that of the FM carrier signal, and then recorded. Since the AM signal recovered during reproduction has been subjected to and thus contains the same wow and flutter noise as the FM signal, it may be used to subtractively cancel such noise in the FM signal to be reproduced.

According to a further embodiment an input signal is frequency-modulated and recorded on a magnetic medium, and the FM carrier signal is simultaneously recorded on a separate recording track on the same medium. During reproduction the FM noise component extracted from the carrier signal is superimposed on the signal recovered from the frequency-modulated signal to subtractively cancel such noise, thereby minimizing or eliminating wow and flutter noise from the final output signal.

Since frequency modulation is employed it is possible to record and reproduce a DC input signal. Furthermore, during reproduction the recovered AM signal or FM carrier may be used as a control signal such as for the recording medium transport system.

DETAILED DESCRIPTION OF THE PREFERRED EMBODIMENTS

Figure 1:
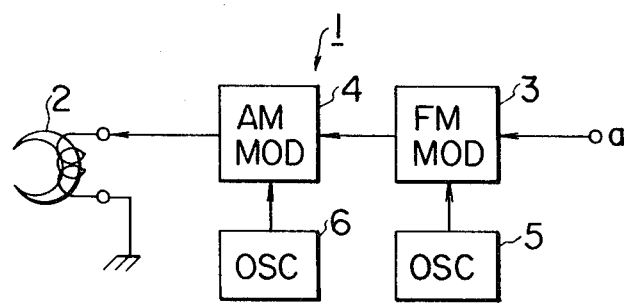
FIG. 1 shows a block diagram of an audio signal recording system in accordance with a first embodiment the present invention.

Referring to FIG. 1, a recording system 1 comprises a frequency modulator 3 and an amplitude modulator 4 connected in series between an input terminal a and a magnetic tape recording head 2. The frequency modulator 3 is supplied with an FM carrier from an oscillator 5. The output of the oscillator 5 is thus frequency-modulated with an audio signal applied to the input terminal a in a conventional manner. The amplitude modulator 4 is similarly supplied with a modulation signal from an oscillator 6, and subjects the FM output signal from modulator 3 to amplitude modulation by the output of oscillator 6. The output frequency of the oscillator 6 is lower than that of the FM carrier from oscillator 5.

Figure 2:
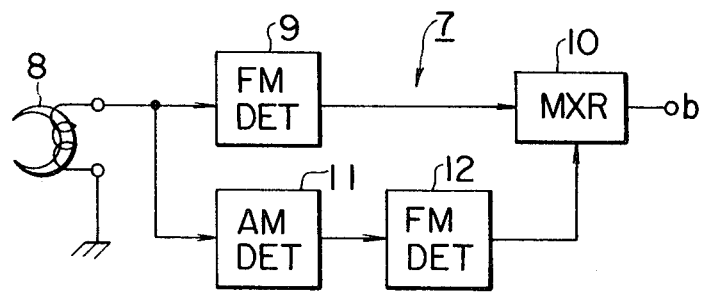
FIG. 2 shows a block diagram of a noise cancelling reproducing system in accordance with the invention, complimentary to the recording system of FIG. 1.

Referring to FIG. 2, a complimentary reproduction/-recovering system 7 comprises an FM detector 9 and a mixer 10 connected in series between a reproducing head 8 and an output terminal b, and an AM detector 11 and an FM detector 12 connected in series between the reproducing head 8 and the mixer 10. The FM detector or demodulator 9 extracts the audio signal from the double-modulated signal picked up by the reproducing head 8 and delivers it to the mixer 10. The AM and FM detectors 11, 12 serve to separate out the FM noise components from the double-modulated signal and deliver them to the mixer. That is, the AM detector 11 recovers the amplitude modulation signal originally supplied by the oscillator 6, while the FM detector 12 recovers any frequency variations present in the AM signal, i.e. FM noise such as wow and flutter. The mixer 10 superimposes the FM noise on the demodulated audio signal with reverse polarity or phase, to thereby subtractively cancel and remove such noise.

Assuming that an audio signal M is to be recorded by the system 1, it is first applied to the frequency modulator 3 to obtain a modulated signal A sin $(\omega_c+M)t$, which is then applied to the amplitude modulator 4. The frequency-modulated carrier wave is the output A sin $\omega_c t$ of the oscillator 5. The amplitude modulator 4 subjects the frequency-modulated signal A sin $(\omega_c+M)t$ to amplitude modulation with the output $A_0$ sin $\omega_c/2t$ of the oscillator 6, to thereby obtain a composite or double-modulated signal MFA = $A_0$ sin $\omega_c/2t \cdot$ sin $(\omega_c+M)t$ which is applied to the head 2 and recorded on a magnetic tape (not shown).

The double-modulated signal MFA recorded on the magnetic tape is picked up by the reproducing head 8 and delivered simultaneously or in parallel to the FM detector 9 and the AM detector 11. The detector 9 subjects the modulated signal MFA to FM detection to obtain the audio signal $M+\Delta\omega$, wherein $\Delta\omega$ represents the FM noise component, which is applied to the mixer 10. At the same time the detector 11 subjects the modulated signal MFA to AM detection to obtain a signal $$A_0 \sin\left(\frac{\omega_c}{2} + \Delta\omega\right) t,$$

which is applied to the FM detector 12. The latter functions to recover the frequency-modulation noise $\Delta\omega$ due to wow and flutter included in the AM signal, and delivers it to the mixer 10 to cancel such wow and flutter noise from the audio signal M as described above.

Figure 3:
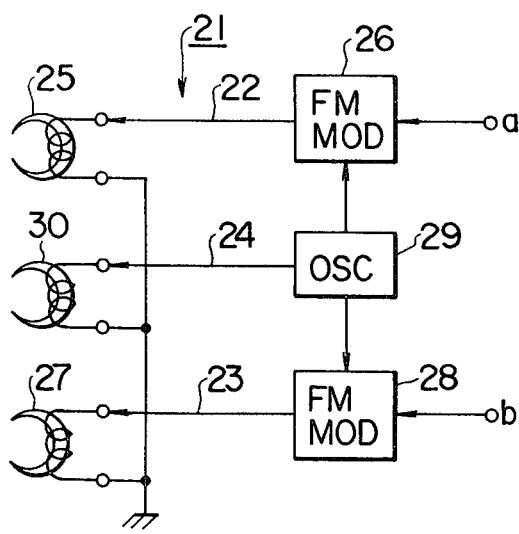
FIG. 3 shows a block diagram of an audio signal recording system in accordance with a further embodiment of the present invention.

Referring to the second embodiment shown in FIG. 3, a recording system 21 comprises a first audio signal channel 22, a second audio signal channel 23, and a carrier wave channel 24. The first channel 22 includes a frequency modulator 26 connected between an input terminal a and a recording head 25. Similarly, the second channel 23 includes a frequency modulator 28 connected between an input terminal b and a recording head 27. The first and second channels are supplied by a common FM carrier wave oscillator 29. In the third channel a recording head 30 is directly connected to the oscillator 29. The modulators 26 and 28 frequency-modulate the output of the oscillator 29 with signals applied to the input terminals a and b, respectively.

Figure 4:
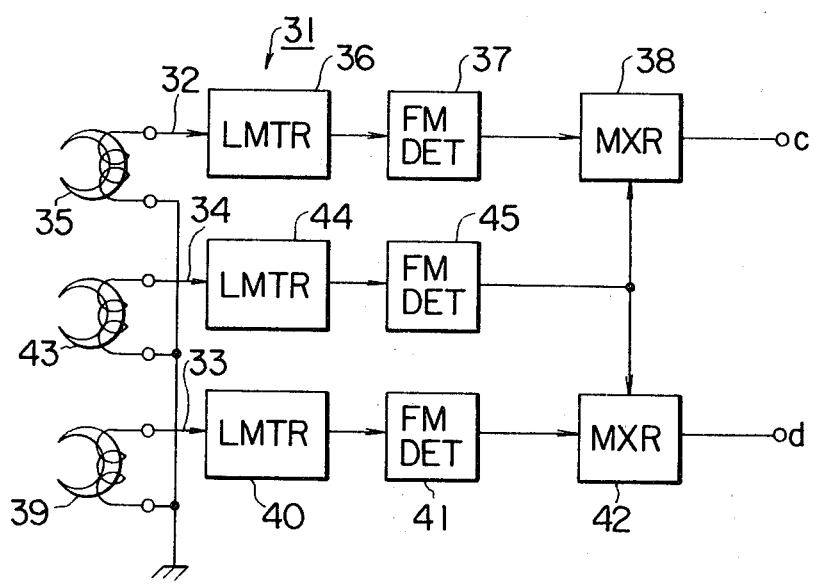
FIG. 4 shows a block diagram of a noise cancelling audio signal reproducing system complimentary to the recording system of FIG. 3.

Complimentary to the recording system 21, the reproducing system 31 shown in FIG. 4 comprises a first audio output channel 32, a second audio output channel 33, and a carrier wave channel 34. The first channel 32 includes a limiter 36, an FM detector or demodulator 37 and a mixer 38 serially connected in the stated order between a reproducing head 35 and an output terminal c. Similarly, the second channel 33 includes a limiter 40, an FM detector or demodulator 41 and a mixer 42 connected in series between a reproducing head 39 and an output terminal d. The carrier channel 34 includes a reproducing head 43, a limiter 44 and an FM detector or demodulator 45 whose output is connected to the mixers 38 and 42.

Figure 5:
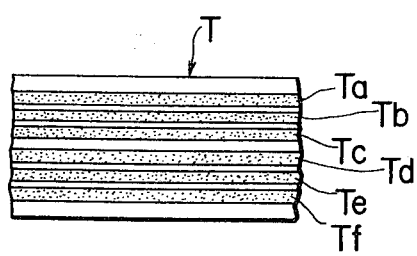
FIG. 5 shows a partial plan view of a magnetic tape which may be employed in the embodiment shown in FIGS. 3 and 4.

Assuming that the recording system 21 is supplied with left and right channel audio signals L and R, respectively, such signals are applied to the input terminals a and b of the first and second channels 22 and 23, respectively. The input signal L modulates the frequency of the FM carrier supplied by the oscillator 29 in the modulator 26, and the modulated output signal LM is applied to the recording head 25. Similarly, the frequency modulated output RM of the modulator 28 is applied to the recording head 27. At the same time, the carrier wave signal M from the oscillator 29 is applied to the recording head 30 in channel 24. The modulated signals LM and RM and the carrier wave signal M are recorded on different tracks of a magnetic tape T as shown in FIG. 5, in which reference characters Ta, Tb and Tc designate "going-path" tracks of the tape while Td, Te and Tf designate "return-path" tracks. The LM signal is recorded on tracks Ta and Tf, and RM signal is recorded on tracks Tc and Td, and the carrier signal M is recorded on tracks Tb and Te.

In the reproducing system 31 the LM signal is picked up by the reproducing head 35 of the first channel 32 and applied through the limiter 36 to the demodulator 37, whose output signal L plus any FM noise component is supplied to the mixer 38. Similarly, the RM signal is picked up by the reproducing head 39 of the second channel 33 and applied through the limiter 40 to the demodulator 41, whose output signal R plus any noise is supplied to the mixer 42.

The carrier wave signal M is picked up by the reproducing head 43 of channel 34 and applied through the limiter 44 to the demodulator 45, whose output is supplied to both mixers 38 and 42. If the demodulated signals L and R have picked up any FM noise such as wow and/or flutter during recordation and/or reproduction, such noise is also present in the recovered carrier signal M, and is extracted by and appears in the output of the demodulator 45. This extracted noise signal is superimposed, with a reversed polarity, or phase on the demodulated audio signals L and R in the mixers 38 and 42, to thereby subtractively cancel such noise and supply pure and undistorted audio signals to the output terminals c and d.

The foregoing description relates to the recordation and reproduction of an audio signal, but it is to be understood that a DC input signal may be accomodated in the same manner and with equal facility. Furthermore, although the AM signal $A_0$ sin $\omega_c/2t$ and separate FM carrier signal are only used above to cancel the FM noise contained in the audio signal, they may also be utilized, after recovery, as independent control signals for a tape transport system or the like (not shown).

It is to be understood that the block diagrams shown in the drawings omit various circuit components, such as carrier recovery oscillators and the like, in the interest of simplicity. Such components are well known in the art and form no part of the present invention.

What is claimed is:

1. An apparatus for cancelling noise in a magnetic recording and reproducing system, comprising:
   (a) means for frequency-modulating an FM carrier signal with an input signal,
   (b) means for amplitude modulating the frequency-modulated signal with a further signal which is discriminative from the frequency-modulated signal to thereby produce a double-modulated signal,
   (c) means for recording the double-modulated signal on a magnetic medium,
   (d) means for reproducing the double-modulated signal from the magnetic medium,
   (e) means for frequency-demodulating the reproduced double-modulated signal to recover the input signal, (f) means for amplitude demodulating said reproduced double-modulated signal and for frequency demodulating the amplitude-demodulated signal to extract an FM noise signal generated during recording and reproducing, and (g) means for mixing the recovered input signal with the extracted FM noise signal to cancel such noise component in the recovered input signal as corresponds to said FM noise signal.

2. An apparatus as defined in claim 1, wherein the frequency of the further signal is lower than that of the FM carrier.

3. A method of cancelling noise in a magnetic recording and reproducing system, comprising the steps of:
   (a) frequency-modulating an FM carrier with an input signal,
   (b) amplitude-modulating the frequency-modulated signal with a further signal whose frequency is lower than that of the FM carrier to produce a double-modulated signal,
   (c) magnetically recording the double modulated signal,
   (d) magnetically reproducing the double modulated signal,
   (e) frequency-demodulating the double-modulated signal to recover the input signal,
   (f) amplitude-demodulating the double-modulated signal to recover the further signal,
   (g) frequency-demodulating the recovered further signal to extract any FM noise signal therefrom, and
   (h) mixing the recovered input signal with the extracted FM noise signal to cancel such noise component in the recovered input signal.

4. In a magnetic recording system, a method of enabling the cancellation of an FM noise component during subsequent reproduction, comprising the steps of:
   (a) frequency-modulating an FM carrier with an input signal,
   (b) amplitude-modulating the frequency-modulated signal with a further signal whose frequency is lower than that of the FM carrier to produce a double-modulated signal, and
   (c) magnetically recording the double-modulated signal.

5. A method of cancelling an FM noise component in a magnetic reproducing system, wherein a magnetically recorded signal to be reproduced comprises a frequency-modulated input signal amplitude-modulated with a further signal whose frequency is lower than that of the FM carrier to thereby produce a double-modulated signal, comprising the steps of:
   (a) magnetically reproducing the double-modulated signal,
   (b) frequency-demodulating the double modulated signal to recover the input signal,
   (c) amplitude-demodulating the double-modulated signal to recover the further signal,
   (d) frequency-demodulating the recovered further signal to extract an FM noise signal therefrom, and
   (e) mixing the recovered input signal with the extracted FM noise signal to cancel such noise component in the recovered input signal.

6. An apparatus for cancelling noise in a magnetic recording and reproducing system, comprising:
   (a) means for frequency-modulating an FM carrier with an input signal,
   (b) means for amplitude-modulating the frequency-modulated signal with a further signal whose frequency is lower than that of the FM carrier to produce a double-modulated signal,
   (c) means for magnetically recording the double-modulated signal,
   (d) means for magnetically reproducing the double-modulated signal,
   (e) means for frequency-demodulating the double-modulated signal to recover the input signal,
   (f) means for amplitude-demodulating the double-modulated signal to recover the further signal,
   (g) means for frequency-demodulating the recovered further signal to extract an FM noise signal therefrom, and
   (h) means for mixing the recovered input signal with the extracted FM noise signal to cancel such noise component in the recovered input signal.

7. In a magnetic recording system, an apparatus for enabling the cancellation of an FM noise component during subsequent reproduction, comprising:
   (a) means for frequency-modulating an FM carrier with an input signal,
   (b) means for amplitude-modulating the frequency-modulated signal with a further signal whose frequency is lower than that of the FM carrier to produce a double-modulated signal, and
   (c) means for magnetically recording the double-modulated signal.

8. An apparatus for cancelling an FM noise component in a magnetic reproducing system, wherein a magnetically recorded signal to be reproduced comprises a frequency-modulated input signal amplitude-modulated with a further signal whose frequency is lower than that of the FM carrier to thereby produce a double-modulated signal, comprising:
   (a) means for reproducing the double-modulated signal,
   (b) means for frequency-demodulating the double-modulated signal to recover the input signal,
   (c) means for amplitude-demodulating the double-modulated signal to recover the further signal,
   (d) means for frequency-demodulating the recovered further signal to extract an FM noise signal therefrom, and
   (e) means for mixing the recovered input signal with the extracted FM noise signal to cancel such noise component in the recovered input signal.

9. A apparatus as defined in claims 6, 7 or 8, wherein the input signal is an audio signal, the recording medium is a magnetic tape, the FM noise signal comprises wow and flutter components, the further signal is an oscillator signal, and its frequency is approximately half that of the FM carrier.

* * * * *